SPEECH ANALYZER FOR SPEECH RECOGNITION SYSTEM

Filed July 23, 1965 11 Sheets-Sheet 1

INVENTOR
GENUNG L. CLAPPER

BY [signature]
AGENT

SPEECH ANALYZER FOR SPEECH RECOGNITION SYSTEM

Filed July 23, 1965 11 Sheets-Sheet 4

SPEECH ANALYZER FOR SPEECH RECOGNITION SYSTEM

Filed July 23, 1965

United States Patent Office 3,395,249
Patented July 30, 1968

3,395,249
SPEECH ANALYZER FOR SPEECH RECOGNITION SYSTEM

Genung L. Clapper, Endwell, N.Y., assignor to International Business Machines Corporation, Armonk, N.Y., a corporation of New York Filed July 23, 1965, Ser. No. 474,230
7 Claims. (Cl. 179—1)

ABSTRACT OF THE DISCLOSURE

Speech is separated into frequency bands, formants are located, and vowel sounds are distinguished by logic circuitry that responds to the transitory or invariant nature of the formants. Voicing is ascertained by asymmetry detection. Consonants are detected and logic circuitry is used to establish signals representing where in time the consonants occur with respect to the occurrence of the vowel. The output, representative of a word, can be digitally processed and stored.

The invention relates to speech analysis and speech recognition systems and, more particularly, to an analyzing system for abstracting consonant information from real-time speech sounds.

Abstracting consonant information from speech sounds is set forth in a pending case Serial No. 427,371, filed January 22, 1965 (IBM Docket No. 6604), and assigned to the common assignee. In said pending application, speech sounds are analyzed by frequency analyzers and passed through a formant location system which detects the presence of peak energy transitions by means of time differentiation and time coincidence comparison to yield signal characteristics representative of vowel sounds. The formant energies are further combined with fricative and voice energies to yield signals characteristic of four classes of consonants:

(1) Fricatives and sibilants—f, s, sh, k, t, ch;
(2) Voiced or liquid consonants—w, b, g, m, l, y;
(3) Voiced fricatives—v, z, zh, j, dj, d; and
(4) Unvoiced aspirates—h, soft k, p.

In addition, other characteristics are defined by the presence or absence of energy bursts.

The present invention provides a further refinement to the prior art by describing the temporal relation between the consonant and vowel sounds. Accordingly, the main object of the present invention is the provision of a voice analysis system which provides signals representative of consonant sounds in temporal relation to vowel sounds to provide more realistic information and with more economy than was possible by prior art systems.

Another object resides in the provision of a sound analysis system in which signals are produced to provide speech characteristics indicative of consonants occurring before and/or after vowel sounds, yielding a lesser number of consonant characteristics to provide the same definition that prior art systems provide with more speech characteristics by means of more complex apparatus.

The foregoing and other objects, features and advantages of the invention will be apparent from the following more particular description of preferred embodiments of the invention, as illustrated in the accompanying drawings.

Before presenting a description of the over-all operation of the invention, it might be well to consider the details of the principal components used through the entire specification. These components include a pre-amplifier, an automatic gain control (AGC), frequency selectors, a fricative selector, a voice selector, inverter-integrators for the fricative selector and the voice selector, rectifiers, balance detectors, AND circuits, integrating pulse shapers, differentiators, NOR circuits, OR circuits, dual inverters, latches, a talk control trigger and delay circuits.

*Pre-amplifier*

Figure 3:
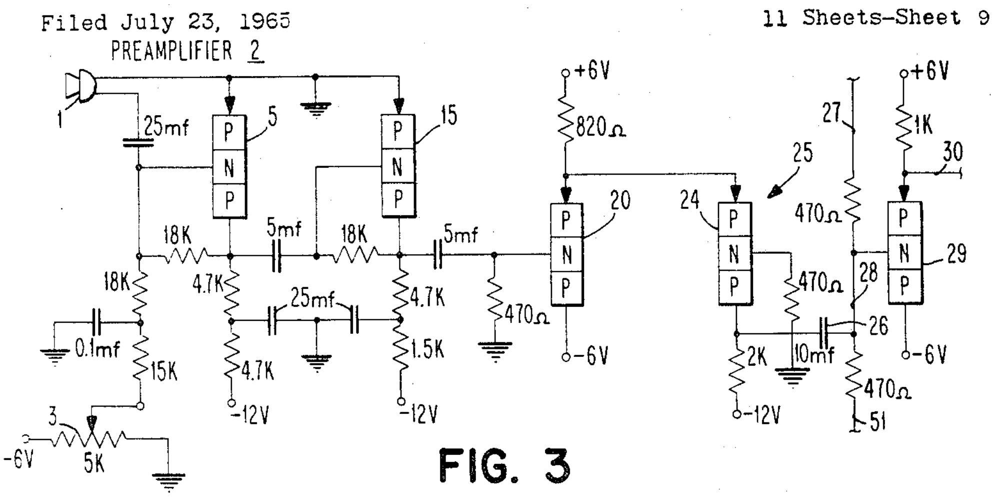
FIG. 3 shows the details of the pre-amplifier.

The function of the pre-amplifier 2 is to amplify the low level signals received from the microphone 1 and to provide, in conjunction with an automatic gain control means, to be described, a uniform output. Referring to FIG. 3, the pre-amplifier comprises essentially five PNP-type transistors, 5, 15, 20, 25 and 29, in the network shown. The first two transistors 5 and 15 are utilized mainly to amplify the incoming waveforms transmitted by the microphone 1. Sensitivity control means 3 is provided to control the gain of the first transistor 5. The amplifier output from the second transistor 15 is coupled to the third transistor 20 which, in conjunction with the fourth transistor 25, forms a voltage amplifier having inherent compression properties. The output of the transistor 25 is applied via capacitor 26 to transistor 29 which serves as a driver to provide a low impedance path to frequency selectors F0 through F15 via the line 30. The output of transistor 25 is also applied to the automatic gain control 35 via line 51.

*Automatic gain control*

Figure 4:
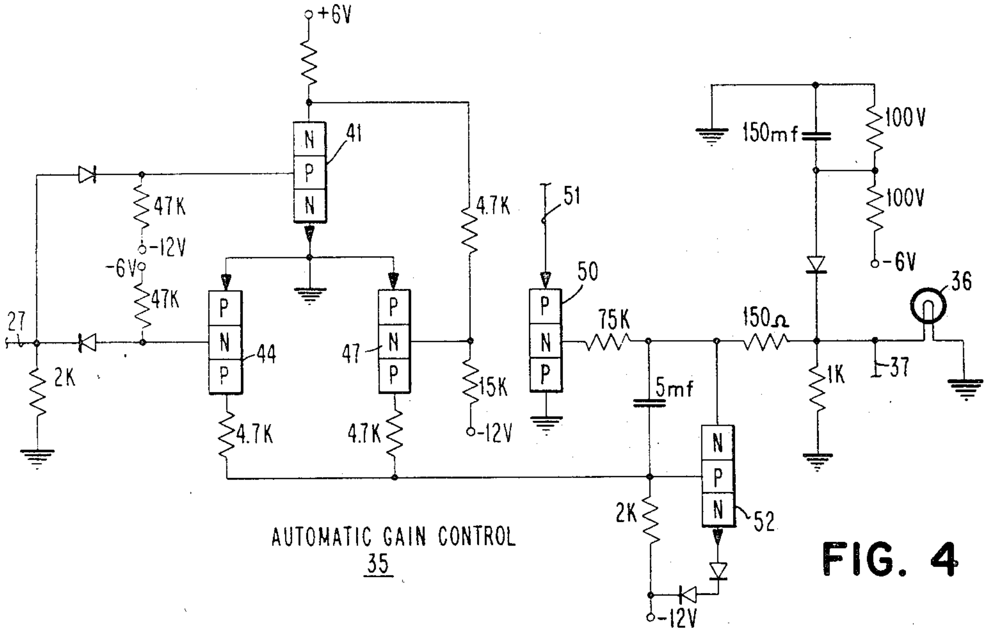
FIG. 4 shows the details of the automatic gain control.

The function of the automatic gain control 35, shown in FIG. 4, is to develop an automatic gain control voltage which is applied to the pre-amplifier 2 and is also applied across an indicator 36 to provide a visual indication when the voltage exceeds a predetermined threshold limit. This control voltage is conducted across a transistor 50 causing its effective impedance to vary and be transmitted to the pre-amplifier via line 51, specifically, to the base of transistor 29, via line 28, and the collector 24 of transistor 25 by way of the coupling capacitor 26.

The normal operation of the automatic gain control circuit is set to plus or minus .4 volts, the range at which the sensitivity control means 3 in the pre-amplifier 2 is set. The maximum range the automatic gain control can be overdriven is plus or minus .5 volts, and the threshold value is established at plus or minus .3 volts. When a positive excursion exceeds .3 volts, transistor 41 is rendered conductive to cause transistor 47 to conduct, the latter providing an output to integrator transistor 52. Conversely, when a negative excursion exceeds .3 volts, transistor 44 conducts to apply a corresponding input to the integrating transistor 52. The output of the transistor 52 accordingly varies the impedance across the variable impedance transistor 50 and the output from the latter is then reflected, via the line 51, to the input of transistor 29 and to the collector of transistor 25 in the pre-amplifier 2. The output of the transistor 52 is also reflected on output line 37 connected to slope detector 145.

*Frequency selectors*

Each of the 14 frequency selectors 80 functions to provide a very sharp band pass characteristic for a preassigned frequency range as indicated in the following chart:

| | Mean Frequency | Range in c.p.s. |
|---|---|---|
| Selector: | | |
| F1 | 3,400 | 3,120-3,750 |
| F2 | 2,840 | 2,590-3,120 |
| F3 | 2,340 | 2,140-2,590 |
| F4 | 1,940 | 1,765-2,140 |
| F5 | 1,590 | 1,458-1,765 |
| F6 | 1,325 | 1,192-1,458 |
| F7 | 1,060 | 970-1,192 |
| F8 | 880 | 800-970 |
| F9 | 720 | 655-800 |
| F10 | 590 | 535-655 |
| F11 | 480 | 444-535 |
| F12 | 408 | 375-444 |
| F13 | 340 | 312-375 |
| F14 | 284 | 260-312 |

Figure 6:
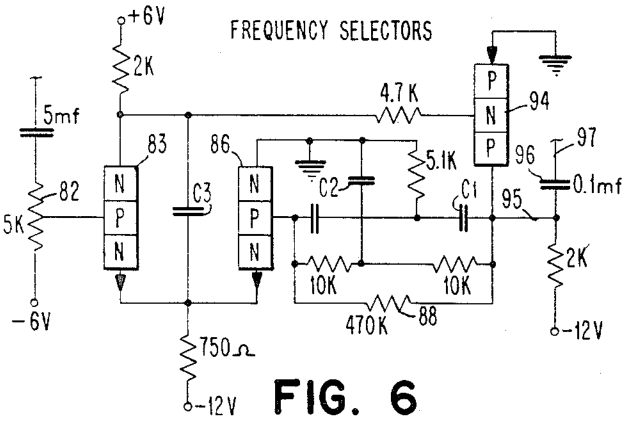
FIG. 6 shows details of an active type of one of 14 frequency selectors.

Referring to FIG. 6, the frequency selector 80 comprises transistors 83 and 86 which operate as a difference amplifier, a twin-T filter network and an output amplifier transistor 94. In operation, the audio input from the preamplifier 2 is applied by way of an attenuator 82 to the transistor 83. The output from the latter is amplified by transistor 94, the output from which is applied to the transistor 86 by way of the twin-T filter network 88. Thus, at all frequencies other than the selected frequency range, inputs at the transistors 83 and 86 are substantially equal, resulting in a relatively low output gain. At the selected frequency, the twin-T filter network 88 passes very little signals so that the output of the amplifier is at a maximum. The output appears on line 95 and is applied to the formant location system via capacitor 96 and line 97.

*Fricative selector*

Figure 10:
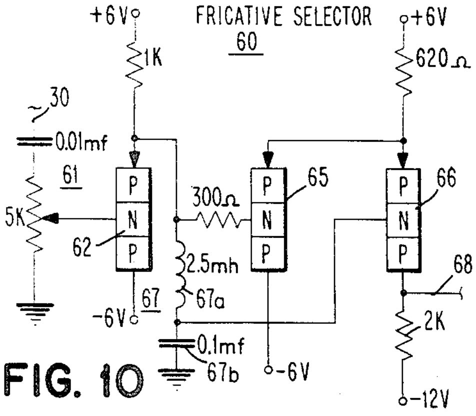
FIG. 10 is a detail of the fricative selector.

Referring to FIG. 10, the fricative selector 60 is used to abstract high frequency noise from the applied audio signal appearing on the line 30. The sibilant selector comprises essentially an attenuator 61, a driver transistor 62 and a difference amplifier consisting of transistors 65 and 66 and a delay network 67 which includes an inductor **67*a* and a capacitor 67*b***. The output of the difference amplifier consists of high frequency noise signals above 4 kc.

*Inverter-integrator*

Figure 11:
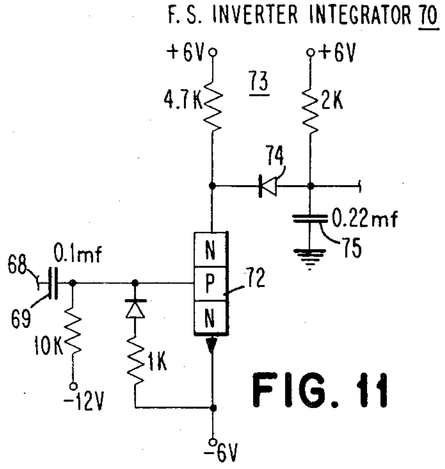
FIG. 11 is a detail of an integrator-inverter connected to the fricative selector.

The output from the fricative selector is applied through a capacitor 69 to an inverter-integrator 70, shown in FIG. 11. This inverter-integrator comprises a biasing network whereby a certain threshold limit is established so that only noise signals above this limit will be admitted and applied to transistor 72. The output from the latter is applied to an integrating circuit 73 consisting of a diode 74 and a capacitor 75. The partially integrated signal issued appearing on the integrating circuit 73 is then applied to an AND circuit **120*o***, to be described hereinafter in detail.

*Voice selector*

Figure 12:
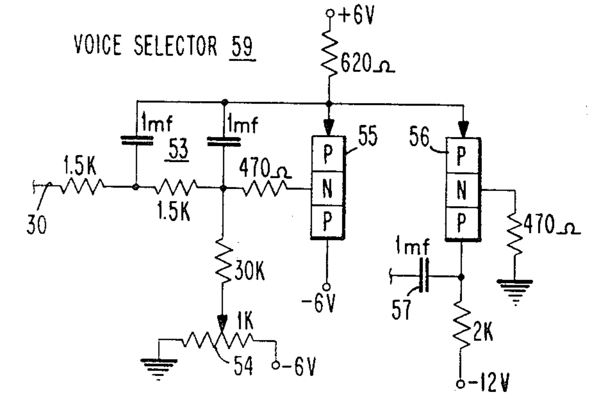
FIG. 12 is a detail of the voice selector.

The voice selector 59 is a broad-band, low-pass filter designed to cut off below 100 cycles in order to eliminate the 60-cycle hum. The voice selector covers the range of voice frequencies from 100 cycles to 250 cycles for both men and women. It is highly sensitive to speech actions such as voice stops; that is, voice actions with the lips compressed. Referring to FIG. 12, the voice selector 59 comprises essentially a low-pass filter network 53 connected to a transistor 55 which functions primarily as an emitter-follower. The output of the latter is fed ino a grounded base transistor 56 which functions as a voltage amplifier to provide a clipped sine wave output.

Figure 13:
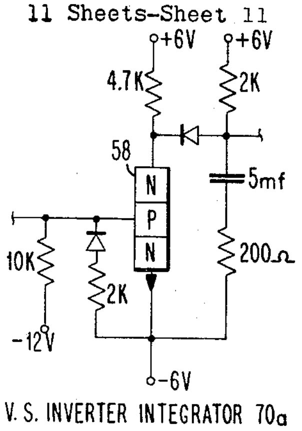
FIG. 13 is a detail of an inverter-integrator connected to the voice selector.

This output is fed to an inverter-integrator **70*a*, shown in FIG. 13, by way of a capacitor 57. The inverter-integrator is essentialy an integrating network which includes a transsitor 58** that provides a D.C. output level having a relatively small amount of noise.

*Rectifiers, balance detectors, and circuits*

The formant location system is comprised of these three basic components: the rectifier 100, the balance detector 110, and the negative AND configuration 120. The rectifier 100 functions to change the output of the frequency selector to a D.C. level which is proportional to the peak-to-peak A.C. output from the frequency selector.

Figure 7:
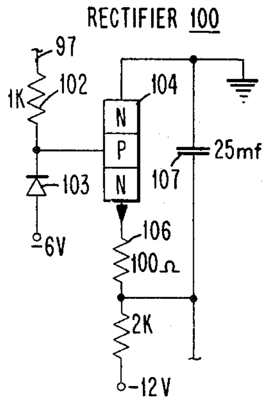
FIG. 7 is a detail of the rectifier.

Referring to FIG. 7, the rectifier 100 comprises primarily a limiting resistor 102, a diode 103 and an NPN transistor 104 arranged as an emitter-follower having in its output a limiting resistor 106 and a filter capacitor 107 coupled to ground. The diode 103, in conjunction with the transistor 104, serves as a voltage doubler to charge the filter capacitor 107 to the full peak-to-peak value of the A.C. input.

Figure 8:
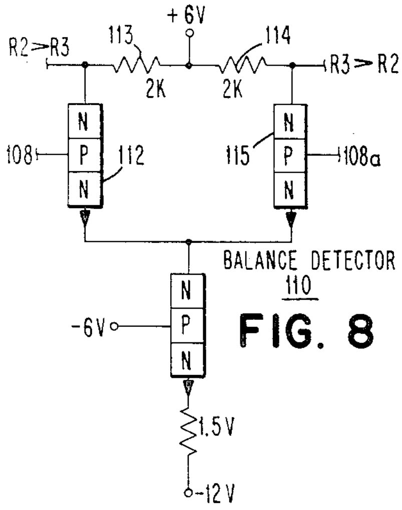
FIG. 8 is a detail of the balance detector.

Referring to FIG. 8, the balance detector 110 comprises transistors 112 and 115 connected in the manner shown, the arrangement serving as a balance amplifier with transistor 117 connected in common to the emitters of transistors 112 and 115. By virtue of this arrangement, transistor 117 serves as a control for limiting current flow through the transistors 112 and 115.

The primary function of the balance detector is to compare the D.C. level outputs from a pair of adjacent rectifiers. For example, one of the rectifier outputs on line 108 from the rectifier R2 is applied to transistor 112 of balance detector No. 2, whereas the output on line **108*a* from the second rectifier R3 is applied to transistor 115. To explain the function of the balance detector, consider first the condition where the D.C. applied levels are of equal magnitude. Under such condition and considering the fact that the function of transistor 117 is to limit the total current flow through transistors 112 and 115 to 4 milliamperes, it follows that, because of the equal D.C. levels, equal currents flow through both transistors 112 and 115, thus limiting the current flow to 2 milliamperes through either of these transistors. The 2-milliampere current flows across associated 2K resistors 113 and 114** to produce a 4-volt drop which places the output at +2 volts above ground, this being considered an inactive condition.

An active condition results when one or the other of two inputs appearing on the lines 108 and **108*a* is greater than the other. For example, consider the input to transistor 112 greater than the input to transistor 115. In this example, transistor 112 will now draw substantially all the current that is controlled through transistor 117, which is approximately 4 milliamperes. Under this condition, the drop across the 2K resistor 113 at the output of transistor 112** is substantially 8 volts to provide an active signal at −2 volts below ground.

Conversely, when the input to the transistor 115 is greater than the input to transistor 112, the current flow through the transistor 115 will cause an 8-volt drop across its output resistor 114, thus providing an active signal of −2 volts below ground.

The active output of the balance detector expresses an inequality between a pair of applied rectifier outputs. For example, balance detector No. 2 provides an output which indicates that rectifier No. 2 output is greater than rectifier No. 3 output (R2>R3) or an indication that rectifier No. 3 output is greater than rectifier No. 2 output (R3>R2).

The negative AND circuits 120 are employed to determine the conjunction of two inequalities representative of a local maximum. The outputs from an adjacent pair of balance detectors; for example, balance detectors No. 2 and 3, are applied to negative AND circuit No. 3 which establishes a local maximum on its output line, indicating that the output of rectifier No. 3 is greater than the output from either rectifier No. 2 or No. 4.

The outputs from the balance detectors (i.e., two outputs from each of the balance detectors 1 through 14) are applied to the negative AND circuits 120.

Figure 2:
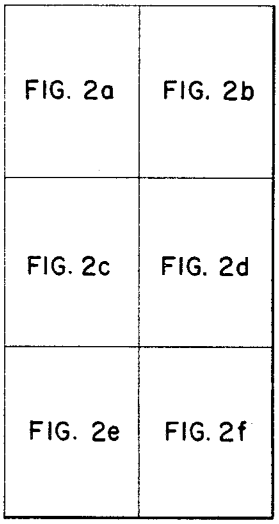
FIG. 2 shows how
Figure 2A:
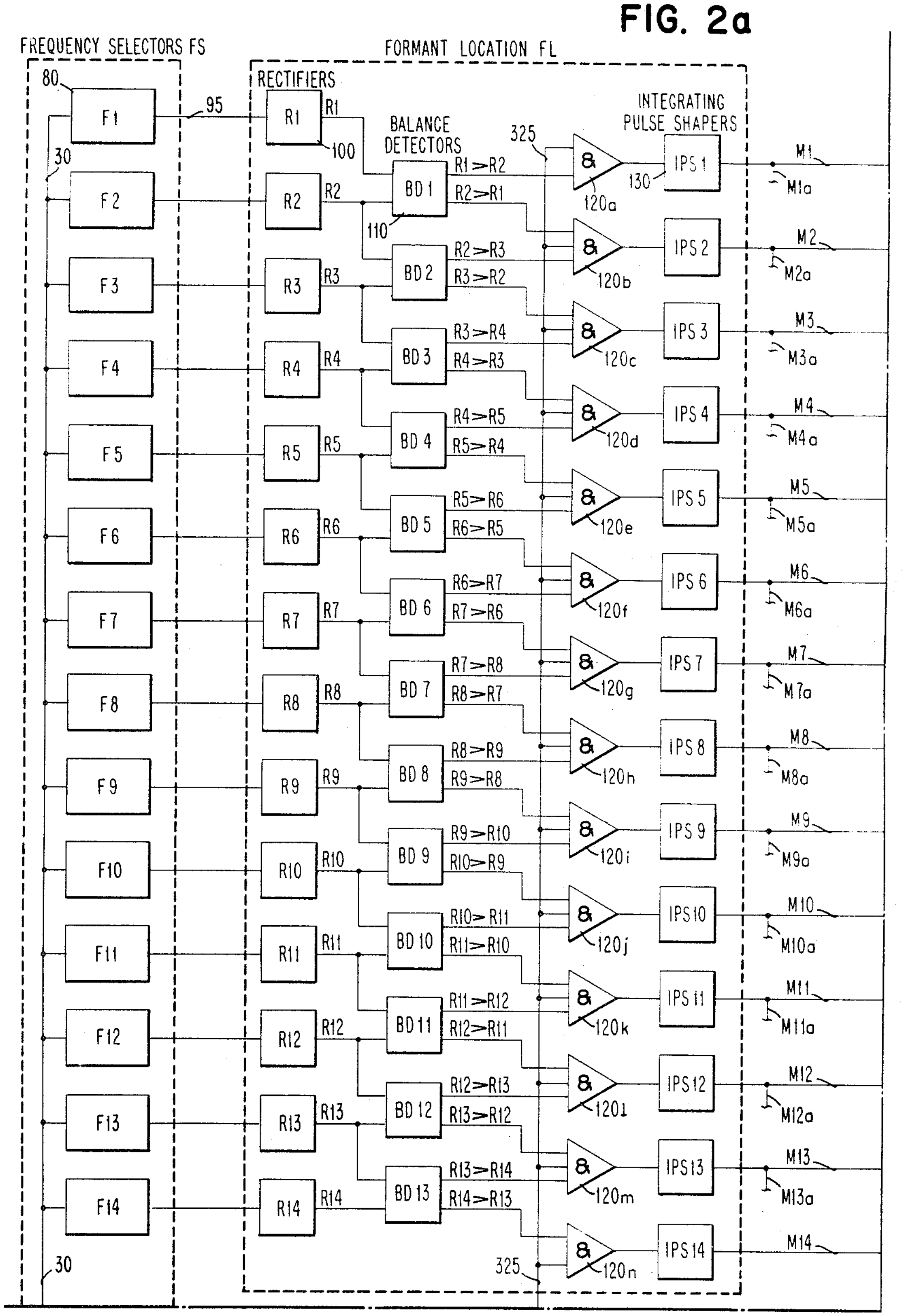
FIGS. 2*a* through 2*f* are assembled to show the details of the system constituting the invention.

As illustrated in FIG. 2*a*, the outputs from the balance detectors 110 are applied to each of the negative AND circuits 120; for example, the outputs from balance detector No. 2 are applied to negative AND circuits No. 2 and No. 3. The function of the negative AND circuit is to detect the coincidence of the negative active signals issued by the balance detectors.

Figure 9:
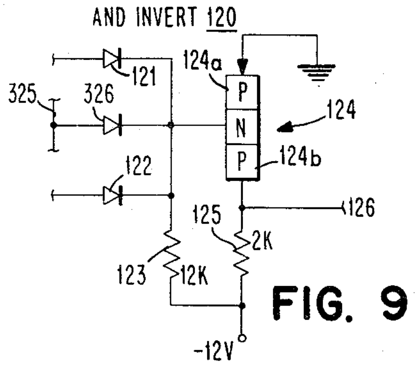
FIG. 9 shows the details of an AND-Invert circuit.

The negative AND circuit 120, as detailed in FIG. 9, comprises an input network consisting of three input diodes 121, 122, and 326; a resistor 123; and a transistor 124, to which the input network is connected as shown.

In operation, consider a condition where both inputs to the negative AND circuit are active (that is, the signal outputs from the balance detectors are constituted of negative signal levels below ground) and a signal is present on the diode 326. Under this condition, all diodes 121, 122, and 326, will be reverse biased, resulting in a current flow through the transistor 124 from emitter **124*a* through base and through the resistor 123 to −12 volts. This causes a current flow through the transistor from emitter through collector 124*b* and through resistor 125 to −12 volts. Due to this current flow, the collector rises to substantially ground level, providing an output on line 126** which output is indicative of the local maximum.

When one or the other of the two inputs to diodes 121 and 122 is positive, at a time when a signal is present in the diode 326, the base of the transistor 124 is raised above ground level, thus cutting off conduction in the transistor, thereby resulting in a drop in the output thereof to substantially −12 volts, this being indicative of the off condition. The outputs representing local maxima from the various negative AND circuits 1 through 14 are applied to the integrating pulse shapers 130, which as earlier described, function to remove jitter (that is, undesirable transients) from the signals representing local maxima.

*Integrating pulse shaper*

Figure 15:
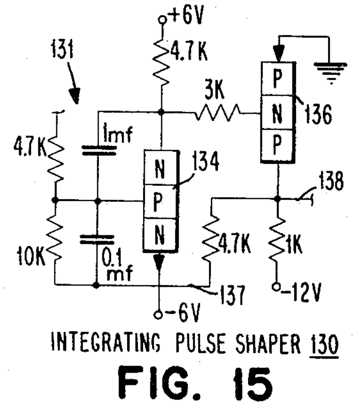
FIG. 15 is a detail of an integrator pulse shaper.

The function of the integrating pulse shaper (IPS) 130 to remove transients which may be present in the applied incoming signals to provide an integrated and shaped output signal. The IPS, as seen in FIG. 15, comprises transistors 134 and 136 with an integrating network 131 at the input of transistor 134 and a feedback loop 137 from the output of transistor 136 to the input of transistor 134. The feedback network includes a resistor divider circuit which provides hysteresis characteristics.

For A.C. signals, an integrating action takes place by virtue of the circuit which includes the input resistor and the capacitor between the base and collector of transistor 134. By virtue of this, A.C. signals are integrated to an effective D.C. input and will have substantially the hysteresis action mentioned.

The pulse shaping aspect of this circuit is accomplished through the positive feedback loop 137 extending from the collector of transistor 136 to the base of transistor 134. When the input rises to −4 volts, conduction is established in transistor 134 which causes the collector voltage to drop to a value below ground. The effect of this is to establish conduction in transistor 136 to produce a rise at the collector of transistor 136 which is fed back by way of the feedback loop 137 to reinforce conduction in the transistor 134. This results in a sharp positive excursion for the leading edge of the output waveform. When the input drops to an effective value of −8 volts, the transistor 134 cuts off, causing the voltage at the collector thereof to rise, thereby cutting off conduction in transistor 136. The resultant drop at the collector of transistor 136 is fed back, by way of the feedback loop 137, to reinforce cutting off conduction in the transistor 134. The resultant sharp excursion provides a steep cutoff for the trailing edge of the output waveform. In this manner, the IPS output is a clean waveform which is substantially a square wave with sharp leading and trailing edges.

*Differentiators*

Figure 16:
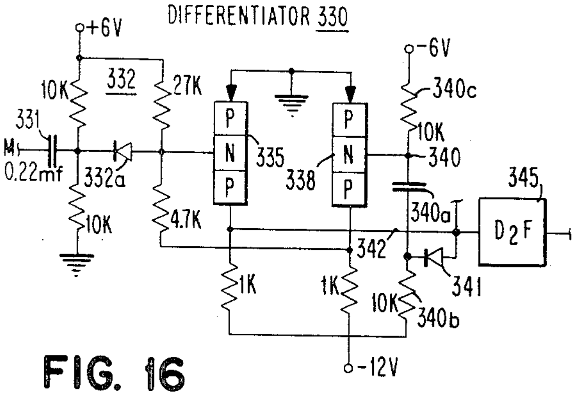
FIG. 16 is a detail of the differentiator circuit.

The differentiators DF and $D_2F$ are similar in circuit design, differing only in the time constant that determines the length of the emitted pulse. The differentiators DF and $D_2F$ are referenced respectively DF1 through DF14 and $D_2F1$ through $D_2F14$. The DF unit 330, shown in FIG. 16, comprises an input differentiating circuit 332 with a biased isolating diode **332*a* to prevent operation from noise spikes. Two transistors 335 and 338 form a monostable pulse generating circuit whose output duration is a function of the RC product of the timing circuit 340 associated with the base of transistor 338. Timing capacitor 340*a* is isolated from the output line by a diode 341** so that it does not load the output. This permits the output to drop sharply at the end of a generated pulse, and so provides a good "turn-on" negative transient for the succeeding pulse shaper $D_2F$. This circuit operates in identical fashion to the one just described, except that it provides a shorter output pulse.

In operation, transistor 338 normaly conducts by reason of base current flowing from ground through the base-emitter diode of the transistor 338 and through a 10K timing resistor **340*c* to −6 volts. The collector of transistor 338 is held near ground as current flows in the collector load. This cuts off transistor 335 and maintains it in a state of non-conduction through the associated resistor divider to +6 volts, which places the base of the transistor 335 at a voltage approximately 0.9 volts above ground. The other side of the input isolating diode 332*a* is midway between +6 volts and ground or approximately 3 volts above ground. Thus, the isolating diode 332*a* is back-biased by at least two volts. A negative input transient of less than two volts will have no effect on the state of conduction of the diode and an input of at least three volts will be required to cause conduction in the transistor. In practice, an input from 9 to 12 volts will be provided assuring the turn-on current for transistor 335. When such a negative-going transient appears at the input to the differentiator, transistor 335 conducts and a positive-going transient from −12 volts to ground appears at its collector. This is coupled by diode 341 to the negative side of the 3.3-microfarad timing capacitor 340*a* and through the capacitor to the base of transistor 338. The sharp rise at the base of transistor 338 cuts off collector current flowing therein and the collector drops sharply, enforcing and maintaining conduction in transistor 335 for as long as transistor 338 is cut off. The duration of the output pulse is thus a function of the value of the timing capacitor 340*a* and the 10K resistor 340*c*. In approximately 35 milliseconds, the voltage at the base of transistor 338 drops to about ground and conduction is reinstated in transistor 338. The rise at the collector cuts off transistor 335 and its collector drops sharply to terminate the output pulse. The output diode 341 decouples the timing circuit at this time and the timing capacitor continues to charge through the 10K resistor to −12 volts. The negative transient at the output of the DF unit 330 causes the $D_2F$ unit 345** to emit a 5-millisecond pulse because of the smaller timing capacitor in the latter. Thus, a 35-millisecond output pulse from the DF unit is followed by a 5-millisecond pulse from the output of the $D_2F$ unit whenever an input pulse ends. The differentiators DF1 through DF14 are employed to emit a 35-millisecond pulse when the termination of a local maximum is detected for a particular band of frequencies. The termination of this 35-millisecond pulse is detected by the differentiators $D_2F1$ through $D_2F14$ and each accordingly issues a 5-millisecond pulse.

*NOR circuit (for formant transients)*

Figure 18:
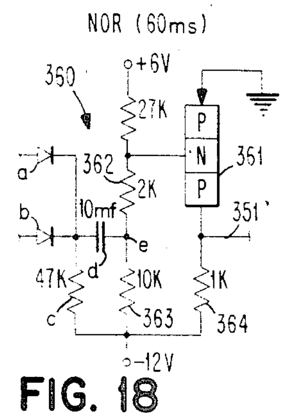
FIG. 18 is a detail of a NOR circuit connected to the outputs of the storage latches.

As previously described, the transition storage latches are set by a coincidence of a DF pulse, indicating the end of a given local maximum, and a pulse representing an adjacent local maximum. The turning on of a transition storage latch inhibits the turning on of the corresponding steady state latch. The inhibiting action is accomplished during a period of 60 milliseconds, after a transition latch has been set, by means of a 60-millisecond NOR circuit, shown in FIG. 18. In this circuit, transistor 361 is normally conducting by reason of base current flowing in the base-emitter diode of the transistor. Base current flows from ground through the emitter base diode and thence through a divider, including resistors 362 and 363 to −12 volts. Collector current then flows through a 1K resistor 364 to the −12 volt source. The collector, as a result, is held at near ground potential, activating line 351 which serves as an input to a steady state latch to be described later hereinafter. An input capacitor **360*d* to the NOR circuit is charged to about 10 volts, the positive side thereof being at about −2 volts and the negative side near −12 volts. When either of the diode inputs 360*a* or 360*b* are raised by a transition latch turning on, the lower side of the capacitor 360*d* is driven to near 0 volts. This 12-volt rise is coupled to the divider point 360*e* which rises from −2 volts to +10 volts, approximately. This action cuts off the transistor and the voltage at the output line 351 drops to −12 volts. The capacitor 360*d*** now discharges and the voltage at the base of the transistor drops to about ground, causing a resumption in conduction through the transistor. This action takes about 60 milliseconds and provides sufficient time to prevent setting up a steady state latch from a $D_2F$ pulse.

*AND, OR circuits*

Figure 19:
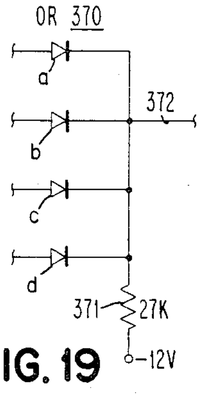
FIG. 19 is a detail of an OR circuit.
Figure 20:
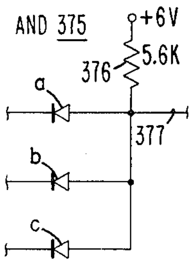
FIG. 20 is a detail of an AND circuit.

FIGS. 19 and 20, respectively, show circuit configurations for an OR and an AND function. The OR configuration consists of a plurality of input diodes **370*a* to 370*d*, connected to a common resistor 371, in turn connected to −12 volts. An input pulse to any diode causes an output signal to be impressed on line 372**.

The AND configuration 375, shown in FIG. 20, comprises input diodes **375*a*, 375*b* and 375*c*, connected to a common resistor 376, in turn connected to a +6 volt source. A coincidence of pulses on all the input diodes provides an output on the output line 377**.

*NOR circuit*

Figure 22:
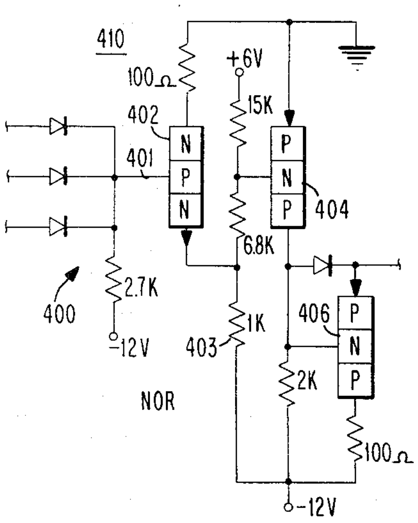
FIG. 22 is a detail of a NOR circuit connected to the output of the dual inverters.

A NOR circuit 410, shown in FIG. 22, comprises a conventional OR circuit 400 provided with three inputs and an output line 401 connected to the base of a transistor 402, which functions as an emitter-follower to provide the proper impedance matching characteristics to the input of a pair of transistors 404 and 406, which function as a power push-pull inverter.

In operation, when all of the inputs to the OR circuit 400 are negative, the transistor 402 is near cut off while the transistor 404 conducts as base current flows into the load resistor 403 of transistor 402. With transistor 404 conducting, transistor 406 is held near cut off while transistor 404 supplies positive current to the load. When any input to the OR circuit rises, transistor 402 conducts and cuts off base current to transistor 404, thereby cutting the latter off and allowing base current to flow in transistor 406. As a result, the output drops to a negative, OFF, level and transistor 406 provides negative current to the load as required. This NOR circuit 410, not only provides a continuous output, but also has a power drive feature which makes it possible to drive many other logic circuits shown in the consonant matrix system. The action of this NOR circuit 410 differs from that previously described for the formant transients in that the former circuit had a temporary output only, whereas this circuit has an output for the total duration of the inputs.

*Slope detector*

Figure 5:
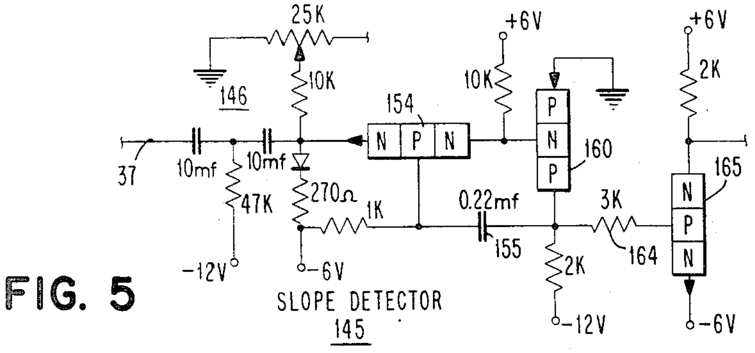
FIG. 5 shows the details of the slope detector.

The slope detector 145 scans the automatic gain control waveform for the presence of sharp negative transients, on line 37, which are indicative of sudden bursts in voice intensity. The slope detector, as shown in FIG. 5, comprises an input network 146 and transistors 154, 160 and 165. Transistor 154, in conjunction with the input network 146, conducts, as a function of the negative slope in the output waveform on the line 37, the output from the automatic gain control. If the slope of the waveform is great enough, current will flow in an amount sufficient to cause conduction through transistor 160 with the result that this transistor 160 emits a positive-going pulse which is fed back, by way of capacitor 155, to the base of transistor 154, thereby resulting in a pulse-forming action. This positive pulse is directly coupled to the base of transistor 165 by way of a series limiting resistor 164. The output from transistor 165 is normally at a positive level near +6 volts. The presence of a sudden burst in voice intensity is denoted by a negative-going pulse excursion to −6 volts. This excursion is applied by way of a controlling AND circuit **120*n*, line 148**, to the input of a burst indication latch shown in FIG. 2*d*.

*Dual inverter*

The dual inverter 390 is designed to provide complementary output signals in response to an input signal supplied by a logic device; for example, the OR circuit shown in FIG. 19. The input signal is at approximately a 0-volt level to indicate an "ON" level input, whereas a −12 volt level is employed to indicate an "OFF" level input signal.

Figure 21:
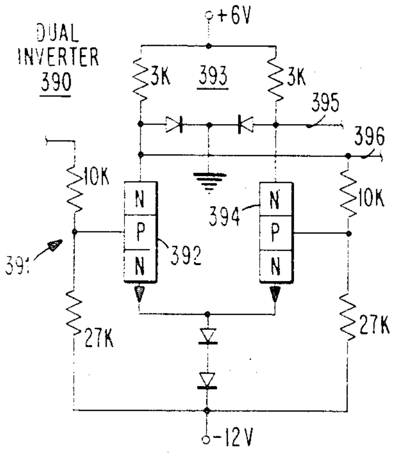
FIG. 21 is a detail of a dual inverter.

The dual inverter shown in FIG. 21 comprises an input divider network 391, a pair of transistors 392, 394 and a resistor diode network 393. In operation, when an OFF signal level of −12 volts is applied to the input network 391, transistor 392 is cut off while transistor 394 conducts. The collector of this transistor 394 assumes a −10 volt level which is applied to the output line 395. At the same time, the collector of transistor 392 assumes a 0-volt level that is applied to output line 396. When an "ON" signal level of 0 volts is applied to the input network 391, transistor 392 is turned on while transistor 394 is turned off. As a result, the collector of transistor 392 assumes a level of −10 volts which is applied to the output line 396 and, at the same time, the collector of transistor 394 assumes a 0-volt level which is applied to the output line 395. In this way, the dual inverter behaves as a connecting device between logic circuits by supplying complementary outputs as well as providing the proper low impedance current paths therebetween.

*Latch*

Figure 17:
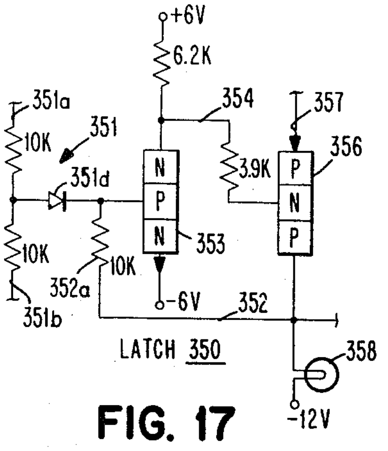
FIG. 17 is a detail of a latch.

Format storage and indication functions are provided by latches; a typical latch circuit 350 is shown in FIG. 17. Each latch comprises an input voltage coincidence network 351, a pair of transistors 353 and 356, and an indicator 358. Prior to its operation, a reset pulse is applied to the latch to restore it to a reset condition.

Following the reset pulse, both transistors 353 and 356 are cut off. The base of transistor 353 is held below −6 volts by the output, the collector of transistor 356. The latter is held off by a line 354 connected to the collector of transistor 353 which is near +6 volts. If both inputs **351*a* and 351*b* are near −12 volts, the base of transistor 353 is also near −12 volts. With one input at −12 volts and one at ground, the equivalent resistance of the input is 5K to −6 volts and, since a 10K resistor 352***a* in output line 352 connected to −12 volts limits current flow to about 0.4 milliamperes in the 5K equivalent input resistance, there results a net drop of 2 volts below the −6 volt equivalent input voltage. This does not take into account the drop through diode 351*d* which will add somewhat to the cut-off voltage. Thus, with only one input on, the latch is maintained at cut off.

When both inputs are raised to about ground (0 volts), current flows in the base of transistor 353 to turn the latter on. The collector drops and turns on transistor 356, which raises its collector to near ground to cause the indicator lamp to light. The 10K resistor 352*a* from the output to the base of transistor 353 now provides enough base current to keep this transistor on, even though both inputs should drop to −12 volts. The isolating input diode 341*d* is backbiased for this condition so that base current does not flow away from the base of transistor 353. Thus, the latch will stay on until reset.

When the Reset Key R is operated, a reset pulse from 0 volts to −12 volts is applied to the emitter of transistor 353, causing the latter to be cut off, the indicator lamp to be extinguished, and transistor 353 to be cut off. This raises the base of transistor 356 to +6 volts so that the transistor remains off when the common reset line returns to 0 volts. A delay means may be incorporated in the reset line, in the manner shown, to assure reset when power is applied. The latches are found in the FTS and IFD units for storing falling (F) and rising (R) transients, as well as steady state (S) formants. The latches are also employed in the consonant matrix CMS to store vector characteristics representing the consonant sounds of the voice spectrum.

*Talk control trigger*

Figure 14:
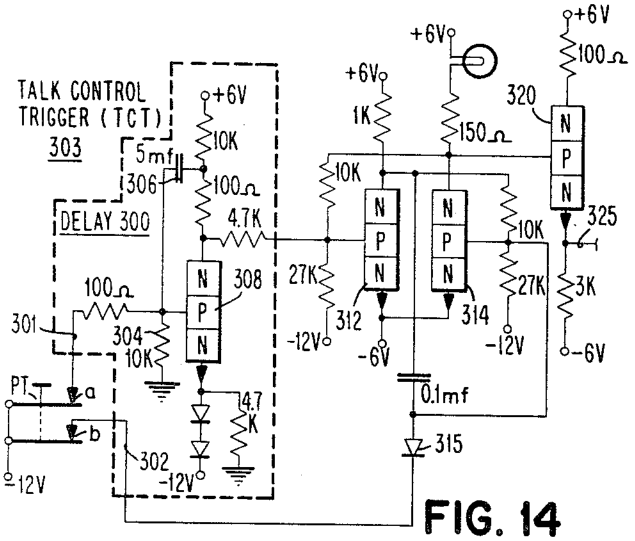
FIG. 14 shows the details of the talk control trigger.

The talk control trigger 303, FIG. 14, is activated in response to the manual operation of a press-to-talk key PT during the time that words are spoken into the microphone 1 for recognition. The output from this trigger activates the gate line 325 connected to all the AND circuits 120 in the formant location system, thereby enabling all recognized formants, including the voice and fricative representing signals, to enter the formant transition detection means and the consonant matrix. No speech events are stored for recognition unless the talk control trigger is on.

Referring to FIG. 14, the talk control trigger 303 comprises essentially four transistors; namely, 308, 312, 314 and 320, and a timing capacitor 306 connected to the input circuit feeding the base of the transistor 308. These are all connected in the circuit network constituting the talk control trigger. The on and off controls to the trigger are connected to the press-to-talk key PT provided with a pair of normally closed contacts *a* and *b*. Interposed in the "ON" control circuit is a delay means 300 which provides protection against key clicks when the PT key is operated.

When the press-to-talk key is in its normal position, transistor 308 is held off and the 5-microfarad delay capacitor 306 is fully charged. Transistor 314 is also cut off by virtue of the negative bias applied via the closed "*b*" contacts of the PT key, line 302 and diode 315, which holds the base of the transistor 314 to near −12 volts. Transistors 312 and 320 are conducting by reason of their connections to the collectors of transistors 308 and 314, respectively. The output of the talk control trigger is thus held near +6 volts, which is the "OFF" level for the inputs to the NAND circuits it controls.

When the press-to-talk key PT is depressed, the timing capacitor 306 begins to discharge through the 10K resistor 304 to ground. The diode clamp to the base of transistor 314 is also released. However, the transistor 314 remains cut off as long as transistor 312 conducts. After an interval of about 50 milliseconds, transistor 308 conducts and cuts off transistor 312, causing its collector to rise, thereby causing transistor 314 to conduct current through indicator lamp 316 and also cut off transistor 320. The output on line 325 now drops to the negative "ON" level near −6 volts. All negative AND circuits connected to the line 325 are now gated with this negative level. At the end of the spoken word, and upon release of the key PT, the base of transistor 314 is clamped to −12 volts, causing its collector to rise to cause transistor 320 to conduct to raise the output in the line 325 to near +6 volts. This action deactivates all the NAND circuits and permits the timing capacitor to charge through the 100-ohm resistor to −12 volts.

GENERAL DESCRIPTION

Figure 1:
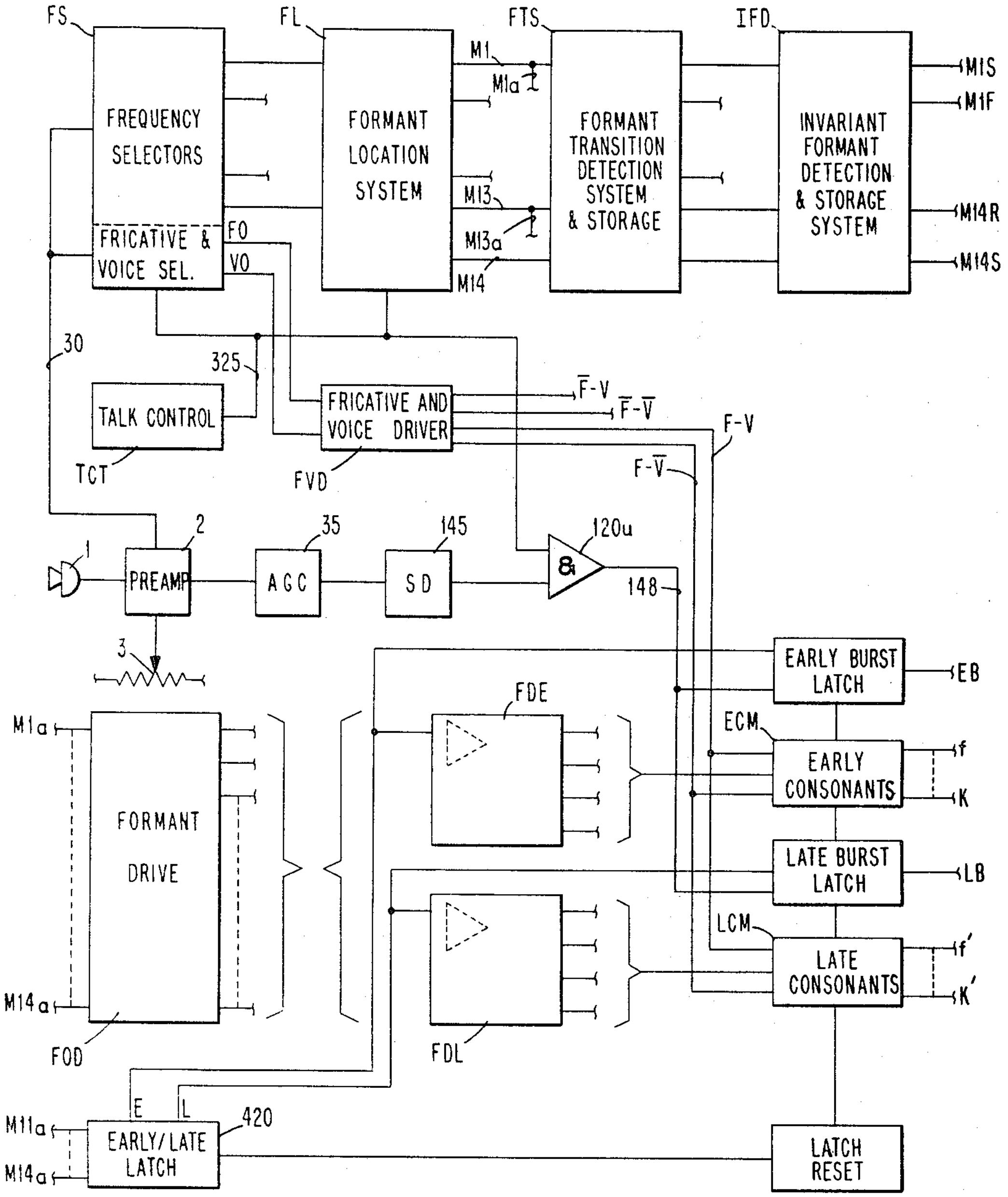
FIG. 1 is a schematic drawing of the system showing the principal sections of the invention.

A comprehensive view of the invention may be had with reference to FIG. 1, in which the principal elements are disclosed essentially in block form, in turn amplified in greater detail in FIGS. 2*a* through 2*f*.

Referring to FIG. 1, speech sounds within the speech spectrum enter the system by way of a microphone 1 which transforms the speech sounds to electrical energy, in turn amplified by pre-amplifier 2. An input sensitivity control means 3 is provided to reject background noise. The pre-amplifier 2 communicates with an automatic gain control means 35 which keeps the gain adjusted dynamically to hold the output of the preamplifier at substantially a constant level. This output appears on line 30 and is in the form of a compressed speech envelope which is analyzed by means of a frequency analyzing system FS containing a plurality of frequency selectors, each of which is tuned to a particular band of frequencies lying in a range extending from 3,750 to 260 c.p.s. There is also a voice selector which is essentially a broad-band, low-pass filter covering the range from 100 c.p.s. to 250 c.p.s. The range of the spectrum from 250 c.p.s. to 3,750 c.p.s. is divided into 14 bands to which the frequency selectors are tuned. By virtue of these frequency selectors, local maxima (formants) corresponding to the peak energies present in the voice spectrum are detected by a formant location system FL. The presence of these formants are transmitted to a formant transition detection system and storage means FTS, wherein formant transitions from one band to another are detected by a process of time differentiation and time coincidence comparison. Formants which appear as steady state energy levels are detected in an invariant formant detection and storage means IFD. Generally speaking, as formants are developed, transitions may be either falling or rising. In the absence of either, a steady state condition prevails.

The detection of the rising and falling transitions and the steady state conditions are accomplished respectively by the formant transition and the invariant formant detection means (FTS and IFD) which provide vector characteristics M1F–M13F; M1R–M14R; and M1S–M14S, representing the vowel sounds.

Consonant characteristics are abstracted by combining the formant energies with four types of signals representing different fricative and voice energy states; namely:

(1) Fricative energy without voice energy ($F \cdot \overline{V}$);

(2) Voice energy without fricative energy ($\overline{F} \cdot V$);

(3) Both fricative and voice energies simultaneously ($F \cdot V$); and (4) Neither fricative nor voice energies present ($\overline{F} \cdot \overline{V}$).

Of these four states, only the first and third are utilized, by way of example, to illustrate the process of abstracting consonant information on the basis of time relationship with the vowel sounds.

For a single syllable word, four possible time relationships may occur; namely:

(1) A consonant preceding the vowel (C—V);

(2) A consonant following the vowel (V—C);

(3) A consonant preceding and following the vowel (C—V—C); and (4) The absence of consonants in relation to the vowel (V).

To detect these relationships, the present invention utilizes two time interval designations—early and late—within which characteristics indicative of consonant sounds are stored in appropriate storage matrices. Thus, consonant characteristics occurring before a vowel sound are stored in an early consonant storage matrix ECM while consonant characteristics occurring after the vowel sound are stored in a late consonant storage matrix LCM.

Since tests have shown that the fricative and sibilant classes are determined with the greatest reliability, the new system uses only the following classes:

| | | | |
|---|---|---|---|
| (1) | Unvoiced fricative | (f) | $F \cdot \overline{V} \cdot C_0$ |
| (2) | Voiced fricative | (v) | $F \cdot \overline{V} \cdot C_0$ |
| (3) | Unvoiced sibilant | (s) | $F \cdot \overline{V} \cdot C_1$ |
| (4) | Voiced sibilant | (z) | $F \cdot \overline{V} \cdot C_1$ |
| (5) | Unvoiced sibilant | (sh) | $F \cdot \overline{V} \cdot C_2$ |
| (6) | Voiced sibilant | (j) | $F \cdot \overline{V} \cdot C_2$ |
| (7) | Unvoiced fricative | (k) | $F \cdot \overline{V} \cdot C_3$ |

Referring to FIG. 1, the formant energies detected by the formant location system FL are transmitted by way of lines M1*a* to M14*a* to a formant driver means FOD containing a matrix which provides outputs depending upon the spectral range of formant energies admitted. These outputs are in turn connected to translators FDE and FDL, both of which are gated under control of an early/late latch 420 influenced by formant energies having a specific spectral range transmitted by way of lines M11*a* through M14*a*, which energies appear at the lower end of the sound frequency spectrum. The translators FDE and FOD, respectively, supply consonant characteristics for those classes of consonants occurring respectively prior to, and after, the energies constituting the vowel characteristics.

Liquid or voiced consonants are interpreted along with the vowel sounds and these are stored in the storage means IFD.

In addition, certain consonant characteristics are necessarily associated with an energy burst which may be either early or late with respect to the vowel. These energy burst characteristics are accommodated in an early burst latch and a late burst latch. In all, a total of 16 bits are generated by means of the present invention to identify 16 consonant characteristics.

*Operation of the system for generating vowel characteristics*

The aforementioned components constituting the invention are connected in the system as shown in FIGS. 2*a* through 2*f* to provide for the development of the vowel characteristics and the early and late consonant characteristics, which embody the novel features of the present invention.

Figure 2B:
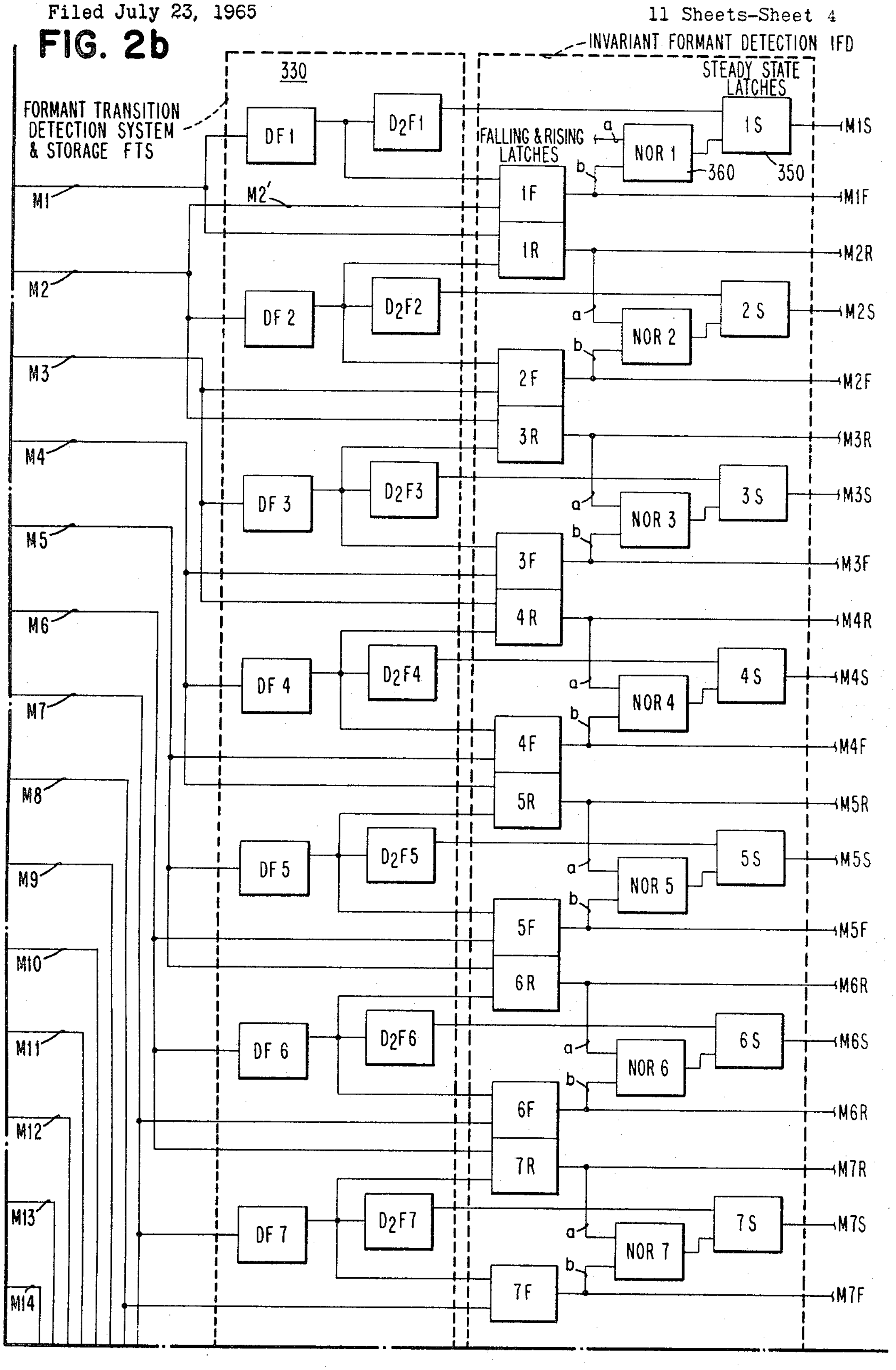
Figure 2C:
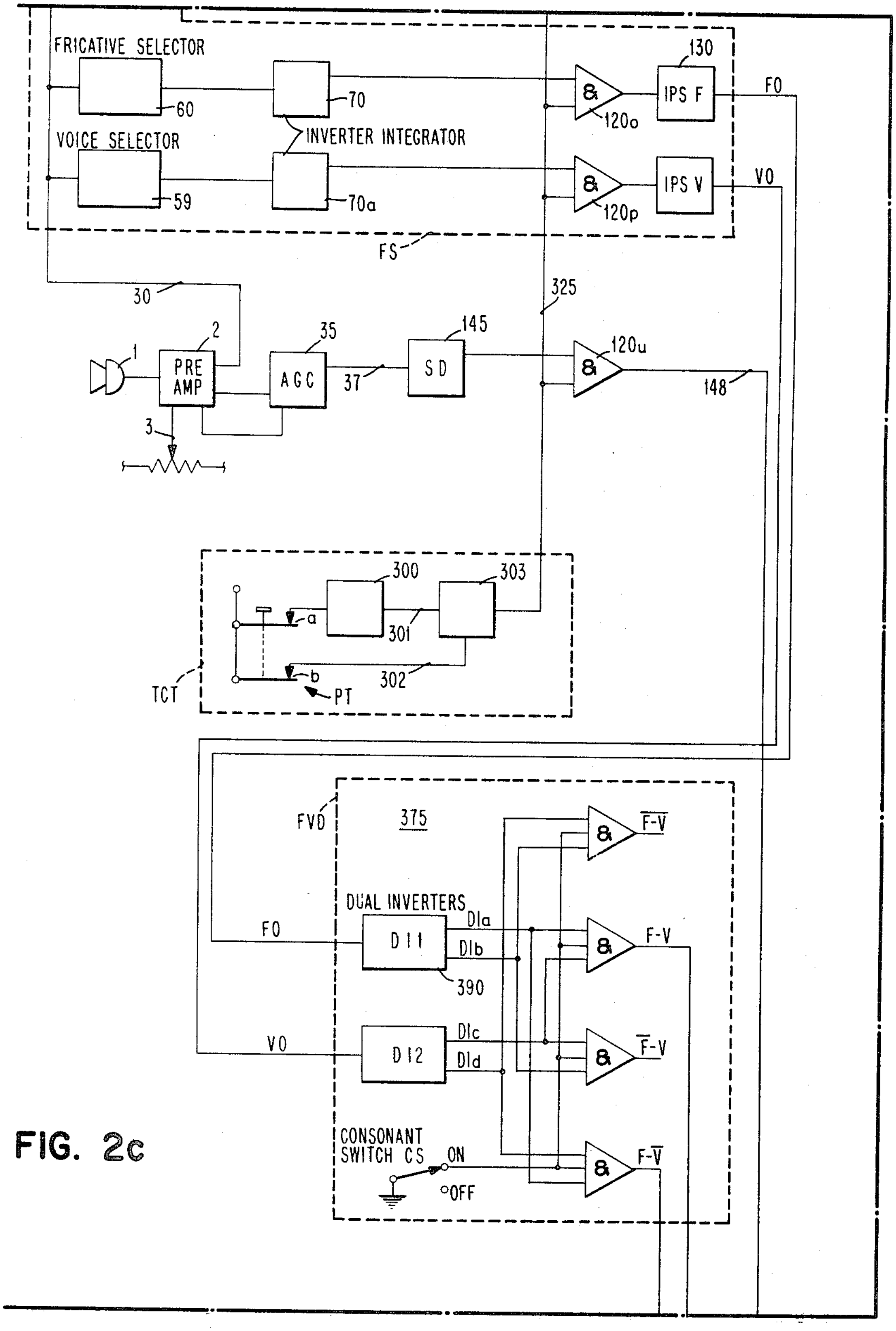

The system is set into operation when the operator depresses the press-to-talk key PT, shown in FIG. 2*c*. This key action turns on the talk control trigger (TCT) 303 to supply a gate signal on the line 325 connected to all of the AND circuits 120*a* through 120*n*, seen in FIG. 2*a*, and also the AND circuits 120*o*, 120*p* and 120*r*, shown in FIG. 2*c*. Sound energy admitted through the microphone 1 passes through the pre-amplifier 2 which provides a compressed speech envelope, the latter as a result of the dynamic action of the automatic gain control unit (AGC) 35, is maintained at substantially a constant level. This compressed speech envelope is applied to the frequency selectors FS in FIG. 2*a* wherein the 14 frequency selectors, referenced 80, are each tuned to admit a specific band of frequencies lying in the range of 3,750 to 260 c.p.s. The compressed speech envelope is also applied to the fricative selector 60 and the voice selector 59, shown in FIG. 2*c*, which yield inverted integrated outputs corresponding to the respective fricative and voice frequencies present in the speech spectrum. The outputs provided by the frequency selectors, in response to the detection of particular frequency bands, are fed to appropriate output lines; for example, line 95 to the formant location system FL, shown in FIG. 2*a*.

As previously explained, the formant location system employs three basic units: the rectifiers 100, the balance detectors 110 and the AND circuits 120. From a visual inspection of the arrangement of the rectifiers and the balance detectors, it can be seen that the presence of formants; that is, energy peaks of a particular frequency band, will appear on the outputs of the balance detectors 110, of which there are 13 in all in the instant embodiment. Considering, for the moment, balance detector BD2, the top line, referenced R2>R3, issues a negative signal level when the quantity R2 (the output from rectifier 2) is greater than R3 (the output from rectifier 3). Conversely, when quantity R3 is greater than R2, the lower line, which is identified R3>R2, issues a negative signal level from the balance detector BD2. When, however, the inputs to the balance detector BD2 are of the same magnitude, no negative signals appear on either of the output lines in question. The presence of a local maximum results in a coincidence of negative signals upon an appropriate pair of output lines which causes an associated AND circuit in the group, referenced 120*a* through 120*n*, to pass said output to an associated integrating pulse shaper 130 in the group referenced IPS1 through IPS14.

The signals appearing at the outputs of the various integrating pulse shapers are constituted of vowel and early and late consonant characteristics, the latter to be described in greater detail at a more appropriate time.

The vowel characteristics may be the result of falling transients, rising transients, or a steady state condition (invariant).

Figure 2D:
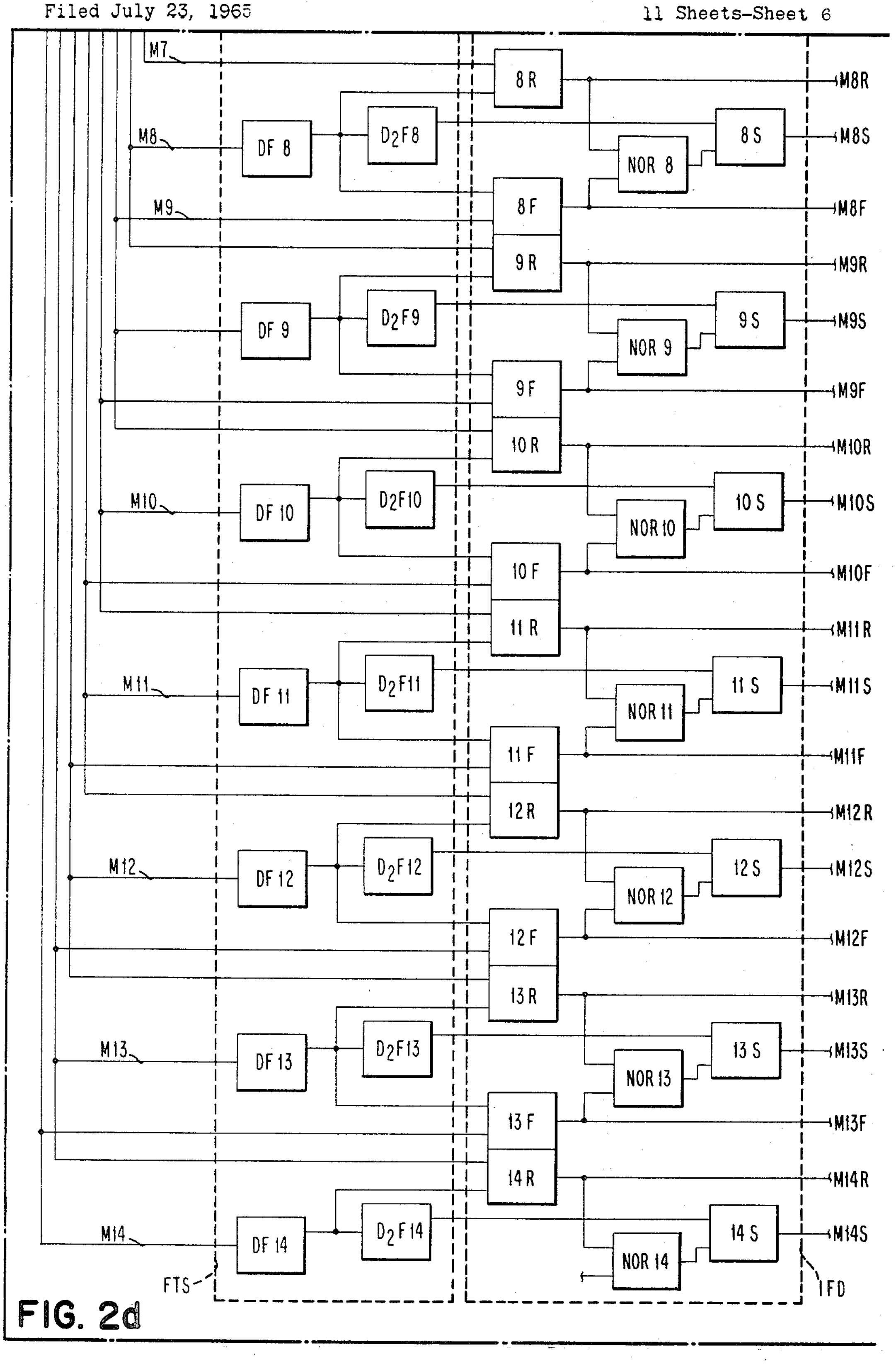

The detection of the rising and falling transients is accomplished by means of the differentiators DF1 through DF14 in conjunction with the falling and rising latches 350, shown in FIGS. 2*b* and 2*d*. The invariant formants; that is, the steady state formants, are detected and stored by the differentiators $D_2F1$ through $D_2F14$ in conjunction with the NOR circuits 360 and the steady state latches 350, also seen in FIGS. 2*b* and 2*d*.

The detection of a falling or rising transient may best be described by considering the activity of an upper frequency band or a lower frequency band adjacent a given frequency band. A rising transient is defined as that transient detected in a frequency band immediately above a given frequency band within which is detected a formant termination. Conversely, a falling transient is defined as that transient detected in a lower frequency band immediately adjacent a given frequency band in which is detected a formant termination. A detailed explanation of these transients may be found in the aforementioned application.

The latches 1F–13F, and 1R–13R, are utilized to store the presence of falling and rising transients. The absence of transients is an indication of steady state (invariant) conditions which are stored in latches 1S–14S. The invariant conditions are detected by means including the NOR circuits NOR 1–NOR 14. By means of the above structure constituting a portion of the present embodiment, 14 invariant characteristics M1S through M14S, 13 falling transient characteristics M1F through M13F and 13 rising transient characteristics M2R through M14R are developed to provide a total of 40 vectors which comprise the vowel characteristics in the speech spectrum.

*Development of early and late consonant characteristics*

Figure 2E:
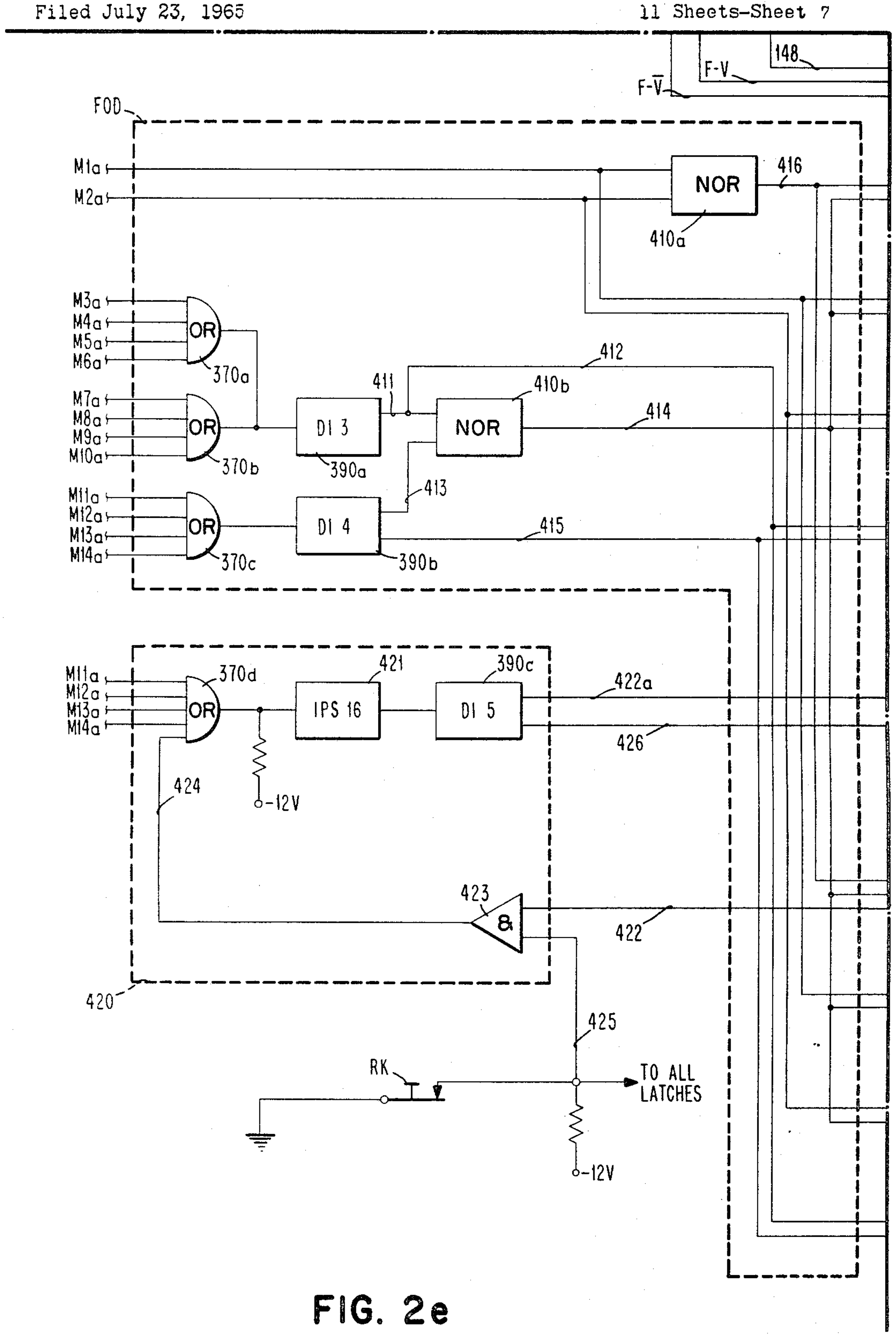
Figure 2F:
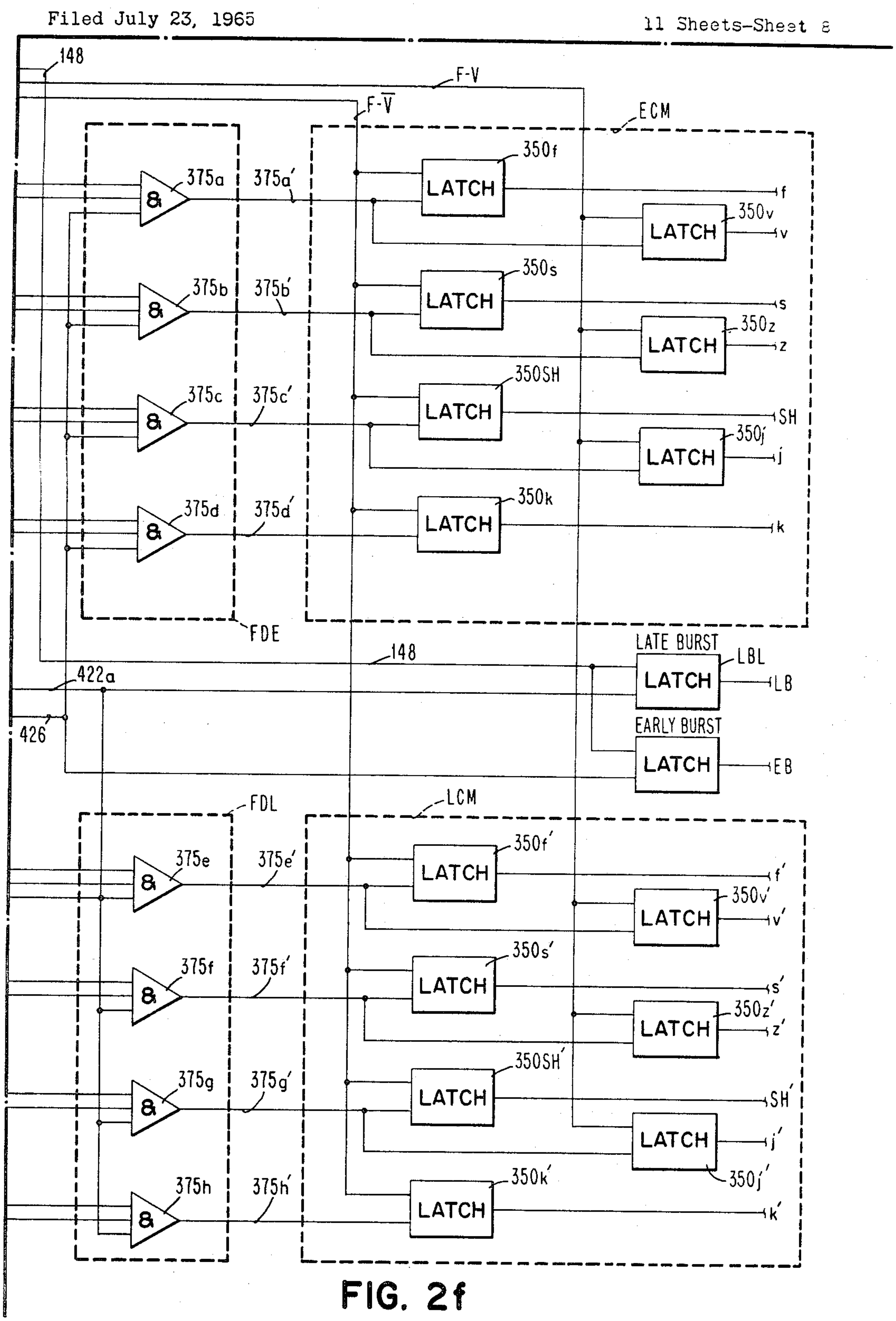

The novel features of the invention for developing the consonant characteristics are shown in FIGS. 2*e* and 2*f*. Herein are shown how the lines M1*a* and M14*a*, over which formant signals are transmitted, are connected to the formant drive means FOD. The formant lines M1*a* and M2*a*, constituting one band of energies, are connected to the inputs of NOR circuit 410*a*, whose output line 416, when up, signifies the absence of formants on both of these input lines. The remaining lines M3*a* through M14*a*, constituting other energy bands, are connected, in the manner shown, to OR circuits 370*a*, 370*b*, 370*c* and 370*d*. The outputs of OR circuits 370*a* and 370*b* are connected to the input of dual inverter 390*a*. The formant lines M11*a* through M14*a* are connected to the OR circuit 370*c*. Output line 411, when up, represents the presence of formants on one or more of the lines M3*a* through M10*a*. Similarly, when output line 413 is up, it indicates the presence of formants on any one or more of the lines M11*a* through M14*a*. Line 415 carries a signal which is the complement to that appearing on the line 413. The output lines 411 and 413 are connected to the inputs of NOR circuit 410, whose output line 414, when up, indicates the absence of formants on the lines M3*a* through M14*a*. The early/late latch 420 is constituted of OR circuit 370*d*, an integrating pulse shaper 421, a dual inverter 390*c*, a latchback path including line 422, AND circuit 423, and line 424, which completes the path to the input to OR circuit 370*d*. A control line 425, when presented with a negative signal, disrupts the latchback operation whereby the latch 420 is turned to its off position. This negative signal is under control of a reset key RK. When the latch 420 is on, a positive signal appears on line 422*a* to denote the presence of the late consonant time control signal. Conversely, when the latch 420 is off, a positive signal appears on the line 426 to denote the presence of the early consonant time control signal. The presence of a formant signal on any one of the input lines M11*a* through M14*a* yields a late consonant time control signal on the output line 422*a*. Conversely, the absence of formants on all lines M11*a* through M14*a* yields an early consonant time control signal on the latch output line 426.

The coincidence of a late consonant signal time control with a burst signal on line 148 sets up a late burst latch LBL to store the condition of a late burst signal LB. The coincidence of an early consonant time control signal with a burst signal on line 148 sets up an early burst latch EBL to store the condition of an early burst signal EB.

The outputs from the formant driver FOD and the early/late latch 420 are interconnected to inputs to a pair of translators FDE and FDL, the former serving to translate formant energies occurring before vowel sounds and the latter translating those energies occurring after vowel sounds. These translators are each constituted of a plurality of AND circuits; namely, 375*a* through 375*d* and 375*e* through 375*h*. Each AND circuit is provided with three inputs. In the translator FED, one input of each AND circuit is gated by the early consonant time control signal appearing on line 426. Correspondingly, the translator FDL is gated by the late consonant time control signal on line 422. Translator output lines 375*a'* through 375*d'* are connected to the early consonant matrix ECM. Translator output lines 375*e'* through 375*h'* are connected to a late consonant matrix LCM. The translators are each constituted primarily of latches 350 for storing respectively the early and late consonant signal characteristics. In addition, the translators are interconnected to the signal lines $F \cdot \overline{V}$ and $F \cdot V$, representing respectively fricative signals without voice and fricative signals with voice, both of which are derived from the fricative and voice driving means FVD.

The coincidence of formant signals occurring early with respect to vowel sounds in combination with the $F \cdot \overline{V}$ and $F \cdot V$ signals causes the energization of appropriate ones of the latches in the early consonant matrix ECM to provide outputs representing the early consonant characteristic signals, which represent the consonant sounds f, v, s, z, sh, j and k, all of which occur before a vowel sound. Similarly, the coincidence of late formant signals in combination with $F \cdot \overline{V}$ and $F \cdot V$ signals energize appropriate ones of the latches in the late consonant matrix LCM to provide the late consonant characteristic signals for the consonant sounds identified as f', v', s', z', sh', j' and k'.

While it has been shown that the simple arrangement described here is sufficient to detect the presence of early and late consonants with respect to a vowel, it is obviously possible to carry this further for use with multiple syllables. In such a system, the vowel and consonant information would be stored in a multiplicity of latch banks, the first bank being identical with that described above.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a voice analyzing system having formant location means responsive to frequencies in the voice spectrum to provide formant signals representing energies present, including frequency responsive means for detecting and manifesting appropriate signals representing the fricative and voice energies present, the combination comprising:

a formant drive matrix responsive to said formant energies to provide appropriate signals representing the presence or absence of different bands of energies;

time relation indicating means responsive to a selected band of said energy bands to provide an early time control signal or late time control signal depending respectively on the presence or absence of said selected band;

an early consonant translator and a late consonant translator, the former responsive jointly to said band energies and said early time control signal to provide early consonant energy representing signals, and the latter translator jointly responsive to said band energies and the late time control signal to provide late consonant energy representing signals; and a consonant storage matrix jointly responsive to the presence of fricative signals, with or without voice signals, and said early and late consonant energy signals for storing manifestations of consonant sound characteristics occurring early or late with respect to the vowel sounds.

2. A system as in claim 1 in which said consonant storage matrix comprises an early consonant matrix and a late consonant matrix for storing respectively the early and late characteristics representing the consonant sounds; namely, f, v, s, z, sh, j and k.

3. A system as in claim 2 in which said early and late consonant matrices are constituted of coincident type bistable devices arranged into groups, one group arranged to store characteristics representing voiced and unvoiced fricatives and sibilants occurring early in relation to vowel sounds, and another group arranged to store the same sound characteristics but which occur late in relation to the vowel sound.

4. A system as in claim 1 further including talk control means conditioning the operation of the formant location means and the fricative and voice frequency detecting means under control of an operator.

5. A system as in claim 1 further including means for detecting burst energies and supplying a burst representing signal, and energy burst storage means jointly responsive to the burst representing signal and the early and late time control signals respectively for storing burst characteristics representing the early consonant burst and the late consonant burst.

6. A system as in claim 1 in which said formant drive matrix provides formant band energy signals derived from a frequency range of approximately 250 to 4,000 c.p.s. to provide output signals representing respectively the presence of formant energies in bands of: 3,000 to 4,000 c.p.s., 2,500 to 3,000 c.p.s., and 250 to 500 c.p.s. and the absence of energy in frequency bands of 2,500 to 4,000 c.p.s., 500 to 2,500 c.p.s. and 250 to 500 c.p.s., and said select band of frequencies constituting the band range of 250 to 500 c.p.s.

7. A system as in claim 6 in which said translators are constituted of logical AND devices responsive to the presence or absence of said frequency bands to provide four classes of consonant energies occurring early or late with respect to vowel sounds.

References Cited

UNITED STATES PATENTS

| | | | |
|---|---|---|---|
| 3,198,884 | 8/1965 | Dersch | 179—1 |
| 3,238,303 | 3/1966 | Dersch | 179—1 |
| 3,296,374 | 1/1967 | Clapper | 179—1 |

KATHLEEN H. CLAFFY, *Primary Examiner.*

R. P. TAYLOR, *Assistant Examiner.*